(12) United States Patent
Wilms et al.

(10) Patent No.: US 7,797,787 B2
(45) Date of Patent: Sep. 21, 2010

(54) CONNECTOR ARRANGEMENT FOR A WIPER DEVICE ON MOTOR VEHICLE WINDSCREENS

(75) Inventors: Christian Wilms, Beringen (BE); David Van Baelen, Herent (BE)

(73) Assignee: Robert Bosch GmbH, Stuttgart (DE)

( * ) Notice: Subject to any disclaimer, the term of this patent is extended or adjusted under 35 U.S.C. 154(b) by 1347 days.

(21) Appl. No.: 10/538,940

(22) PCT Filed: Aug. 1, 2003

(86) PCT No.: PCT/DE03/02601

§ 371 (c)(1),
(2), (4) Date: Jun. 14, 2005

(87) PCT Pub. No.: WO2004/056624

PCT Pub. Date: Jul. 8, 2004

(65) Prior Publication Data

US 2006/0117516 A1    Jun. 8, 2006

(30) Foreign Application Priority Data

Dec. 19, 2002   (DE) ................................ 102 59 477

(51) Int. Cl.
*B60S 1/40* (2006.01)
(52) U.S. Cl. .................... 15/250.32; 15/351; 15/250.43
(58) Field of Classification Search .................. 15/250, 15/32, 250.43, 250.44, 250.351, 250.201; 403/321, 362
See application file for complete search history.

(56) References Cited

U.S. PATENT DOCUMENTS

| 0,583,248 | A |   | 5/1897 | Campbell et al. |   |
|---|---|---|---|---|---|
| 4,094,038 | A |   | 6/1978 | Hancu |   |
| 4,214,343 | A | * | 7/1980 | Dudek | 15/250.32 |
| 4,446,589 | A | * | 5/1984 | Maiocco | 15/250.32 |
| 5,383,248 | A |   | 1/1995 | Ho |   |
| 5,662,427 | A | * | 9/1997 | Chen | 403/362 |
| 6,550,096 | B1 | * | 4/2003 | Stewart et al. | 15/250.32 |
| 6,553,607 | B1 | * | 4/2003 | De Block | 15/250.32 |
| 6,611,988 | B1 | * | 9/2003 | De Block | 15/250.32 |
| 6,625,842 | B1 | * | 9/2003 | De Block | 15/250.32 |

(Continued)

FOREIGN PATENT DOCUMENTS

GB    2100972    1/1983

(Continued)

*Primary Examiner*—Lee D Wilson
(74) *Attorney, Agent, or Firm*—Michael Best & Friedrich LLP (57) ABSTRACT

The invention relates to an arrangement for the detachable connection of a wiper blade on a swivelable wiper arm of a wiper arrangement for windows of motor vehicles, with a bushing that can be connected to the wiper blade or arranged on it for accommodating a plug-in axis of the wiper arm and with a device to lock the plug-in axis in the bushing at least in an operating position of the wiper blade, in which the directions of the longitudinal extension of the wiper blade and the wiper arm are aligned approximately parallel to one another. It is provided that the device for locking includes a catch hook (20) arranged on the wiper blade (12), which in the operating position partially grips around the wiper arm (10) near the plug-in axis (16) and forms an angular limit stop for the wiper blade (12).

12 Claims, 7 Drawing Sheets

U.S. PATENT DOCUMENTS

| | | | |
|---|---|---|---|
| 6,634,056 B1 * | 10/2003 | De Block | 15/250.32 |
| 6,789,289 B2 * | 9/2004 | Op't Roodt | 15/250.32 |
| 6,910,244 B2 * | 6/2005 | De Block et al. | 15/250.32 |
| 7,395,578 B2 * | 7/2008 | Huang | 15/250.32 |
| 2002/0174505 A1 | 11/2002 | Kim | |
| 2003/0163885 A1 * | 9/2003 | De Block et al. | 15/250.32 |
| 2004/0074037 A1 * | 4/2004 | Op't Roodt | 15/250.32 |
| 2004/0093681 A1 * | 5/2004 | Op't Roodt | 15/250.32 |
| 2004/0211021 A1 * | 10/2004 | Weber et al. | 15/250.32 |
| 2006/0117516 A1 * | 6/2006 | Wilms et al. | 15/250.32 |

FOREIGN PATENT DOCUMENTS

| | | |
|---|---|---|
| JP | 56122653 U | 9/1981 |
| JP | 5283133 A | 10/1993 |
| WO | 0073113 | 12/2000 |
| WO | WO 00/73111 | 12/2000 |
| WO | WO 01/30623 | 5/2001 |
| WO | WO 02/066300 | 8/2002 |

* cited by examiner

CONNECTOR ARRANGEMENT FOR A WIPER DEVICE ON MOTOR VEHICLE WINDSCREENS

CROSS-REFERENCE TO RELATED APPLICATIONS

This patent application is a national stage filing under 35 U.S.C. 371 of International Application No. PCT/DE2003/002601, filed Aug. 1, 2003, which claims foreign priority to German Application No. 10259477.5, filed Dec. 19, 2002, the disclosures of which are incorporated by reference herein in their entireties. Priority to each application is hereby claimed.

BACKGROUND OF THE INVENTION

The invention relates to a connecting arrangement of a wiper device for windows of motor vehicles.

Various designs of wiper blades for windows of motor vehicles are known. Non-articulated wiper blades are typically composed of a wiper strip, which is reinforced by means of one or two spring rails and which features a wiper lip that can be applied to the window. The wiper blade can be fastened to a swivelable wiper arm of the motor vehicle in a detachable manner approximately in the center by means of an adapter or a coupling part. In this case, the wiper arm features an adapter section on the end side with a pin situated on it, which can be inserted into a bushing of the coupling part of the wiper arm and enables its rotating movement around the center axis of the pin.

In an operating position the directions of the longitudinal extension of the wiper blade and wiper arm are aligned approximately parallel to one another. In this position, the wiper blade is prevented from being pulled out of its pin bearing by means of a hook that partially grips around the coupling part. At the same time, the hook forms a rotational angle limit stop for the wiper blade. These types of non-articulated wiper blades are not normally suited for being mounted on conventional wiper arms, which do not have a pin for a swivelable connection to the coupling part, but are planned for receiving a fastening clip. For this purpose, one free end of the wiper arm is normally embodied or bent as a U-shaped receptacle.

SUMMARY OF THE INVENTION

An arrangement for the detachable connection of a wiper blade on a swivelable wiper arm of a wiper arrangement for windows of motor vehicles in accordance with a first embodiment of the invention features a bushing that can be connected to the wiper blade or arranged on it for accommodating a plug-in axis of the wiper arm and a device to lock the plug-in axis in the bushing at least in an operating position of the wiper blade. The operating position is characterized in that in this case the directions of the longitudinal extension of the wiper blade and the wiper arm are aligned approximately parallel to one another. The first variation of the invention provides that the device for locking includes a catch hook arranged on the wiper blade, which in the operating position partially grips around the wiper arm near the plug-in axis and forms an angular limit stop for the wiper blade. The catch hook makes sure that in the operating position of the wiper blade an axial movement of the plug-in axis in the bushing is blocked to a large extent. The wiper blade cannot be pulled off of the wiper arm in this position. As a result, a simply constructed and easy to handle locking arrangement is made available, which in addition includes only very few components and therefore can be manufactured very cost-effectively.

A second variation of the connecting arrangement in accordance with the invention provides that the device for locking includes a bow arranged on a free end of the plug-in axis and projecting over its outside diameter, which in the operating position locks the plug-in axis in the bushing so that it can swivel. In the operating position of the wiper blade, an axial movement of the plug-in axis in the bushing is therefore blocked to a large extent. The bushing preferably features a longitudinal groove corresponding to the bow of the plug-in axis so that the plug-in axis can be inserted into the bushing only in a specific angular position and can be swiveled freely around its longitudinal axis in the inserted position and can be moved into an operating position. In this case, the bow arranged on the end of the plug-in axis and projecting over the outside diameter of the plug-in axis blocks the plug-in axis from being pulled out of the bushing since the bow and the longitudinal grove do not align with each other in the operating position. This variation of the connecting arrangement in accordance with the invention also provides an arrangement to lock a wiper blade with a wiper arm that is simple to manufacture and operate, which also distinguishes itself by very cost-effective manufacturability.

A third variation of the connecting arrangement in accordance with the invention provides that the device for locking includes a catch hook arranged on the wiper arm, which in the operating position partially grips around a covering of a coupling element of the wiper blade, which covering contains the bushing, and forms an angular limit stop for the wiper blade. In this case, the free end of the wiper arm continues into the catch hook, which at least partially grips around a corresponding covering of the coupling element of the wiper blade as soon as the wiper blade is swiveled in the vicinity of the operating position. The plug-in axis can preferably be inserted into the bushing of the coupling element only when the wiper blade is situated outside an operating position, i.e., is swiveled by 90° against the wiper arm for example. However, as soon as the wiper blade is swiveled by a small angle out of this assembly position, the catch hook griping around the covering blocks the plug-in axis in the bushing and thereby prevents it from being pulled out. Like the variations that have already been described above, this third variation also provides a connecting element of a wiper blade that is simple to manufacture and easy to handle, which also distinguishes itself by cost-effective manufacturability.

A fourth variation of the connecting arrangement in accordance with the invention provides that the device for locking includes a locking pin arranged near and parallel to the plug-in axis, which locking pin in the operating position engages in a trough-shaped receptacle of a coupling element of the wiper blade and blocks to a large extent an axial movement of the plug-in axis in the bushing and at the same time forms an angular limit stop for the wiper blade. The locking pin preferably features a heel on its free end having a greater thickness than the trough-shaped receptacle so that the locking pin blocks an axial movement of the plug-in axis in the bushing as soon as the locking pin is at least partially in the trough-shaped receptacle.

The previously described variations all distinguish themselves by the fact that the plug-in axis can only be displaced in the bushing in the axial direction in a pre-defined angular range that differs from the operating position. The wiper blade can be separated from the wiper arm only in an angular position outside the operating position.

Finally, a fifth variation of the connecting arrangement in accordance with the invention for the detachable connection of a wiper blade on a swivelable wiper arm of a wiper arrangement for windows of motor vehicles provides for a bushing that can be connected to the wiper blade or arranged on it for accommodating in a lockable manner a plug-in axis that can be connected to the wiper arm, that the plug-in axis is arranged on a second coupling element that can be slid over a free end of the wiper arm and can be locked therewith. The second coupling element can preferably be locked with the free end of the wiper arm. The second coupling element can feature a sleeve-like contour in particular, which can be slid over the free end of the wiper arm and can be locked in a detachable manner with it by means of locking tooth engaging in a receptacle. In this case, the plug-in axis is arranged rigidly on the second coupling element and locked in the bushing in a swivelable manner.

All the variations of the connecting arrangement in accordance with the invention make possible a connection between a wiper blade and a wiper arm of a windshield wiper device for motor vehicles that is simple to lock and detach. These connecting arrangements all distinguish themselves by extremely simple operability and cost-effective manufacturability due to only a few components.

Additional advantageous embodiments of the invention are yielded in the other features cited in the dependent claims.

BRIEF DESCRIPTION OF THE DRAWINGS

In the following, the invention is described in greater detail in preferred exemplary embodiments on the basis of associated drawings. The drawings show.

DETAILED DESCRIPTION

Figure 1:
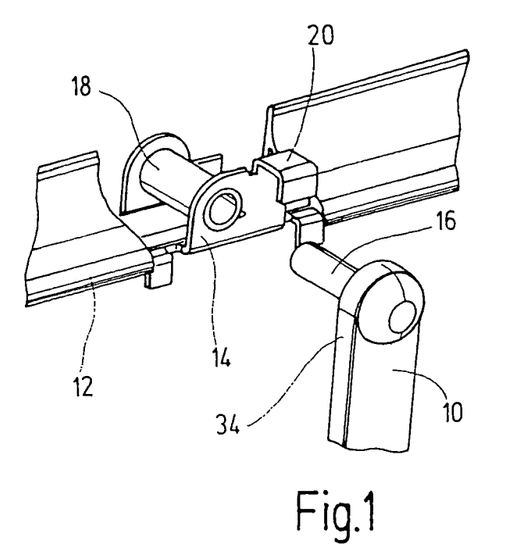
FIGS. 1 through 3 Schematic perspective views of a first variation of the connecting arrangement in accordance with the invention.
Figure 2:
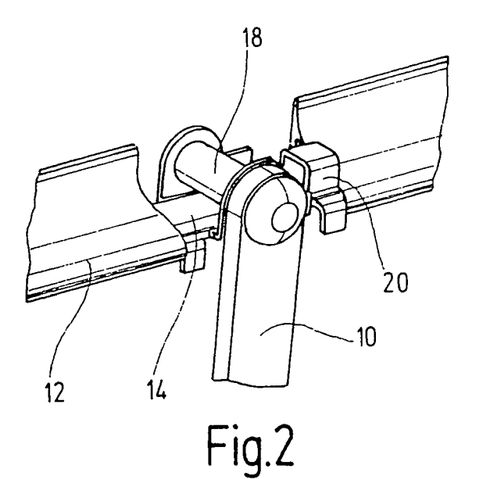
Figure 3:
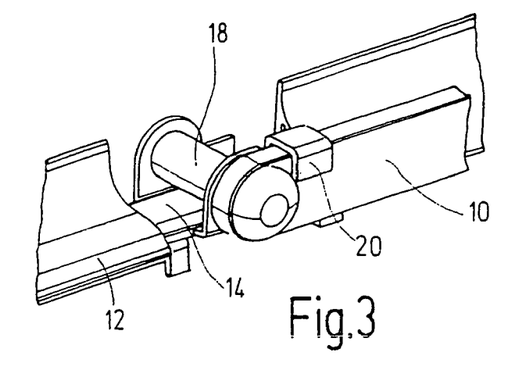
Figure 4:
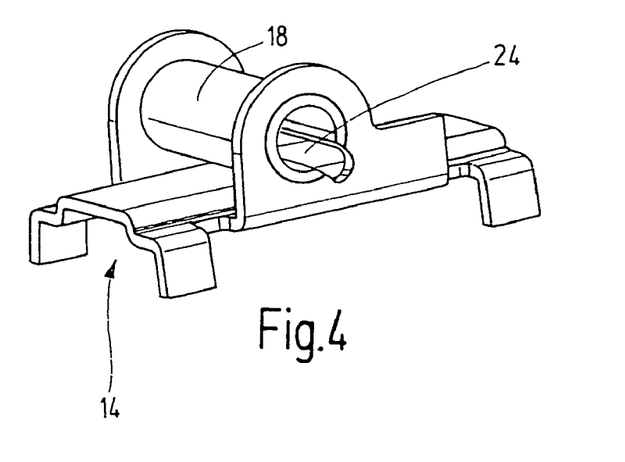
FIGS. 4 through 9 Schematic perspective representations of a second variation of the connecting arrangement in accordance with the invention.
Figure 5:
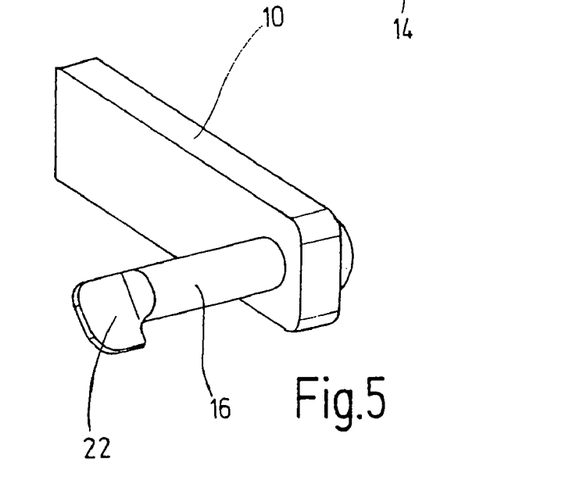

A first variation of a connecting arrangement in accordance with the invention is illustrated on the basis of FIGS. 1 through 3. A plug-in axis 16 that is rectangularly aligned with the direction of the longitudinal extension of the wiper arm 10 is arranged on one free end 34 of a swivelable wiper arm 10. This plug-in axis can be inserted into a bushing 18 of a coupling element 14 and can be swiveled there around a common longitudinal axis of the plug-in axis 16 and the bushing 18. The coupling element 14 is a part of a wiper blade 12 and is preferably firmly connected to it. In addition, a catch hook 20 is provided on the coupling element 14, which partially grips around the wiper arm 10 in an operation position of the wiper blade 12, in which the directions of the longitudinal extension of the wiper arm 10 and the wiper blade 12 are aligned approximately parallel to one another to a large extent (see FIG. 3). FIG. 1 shows the wiper blade 12 separated from the wiper arm 10. FIG. 2 shows the plug-in axis 16 inserted into the bushing 18, whereby the wiper blade 12 is rotated out of an operating position so that the catch hook 20 does not grip around the wiper arm 10.

Figure 6:
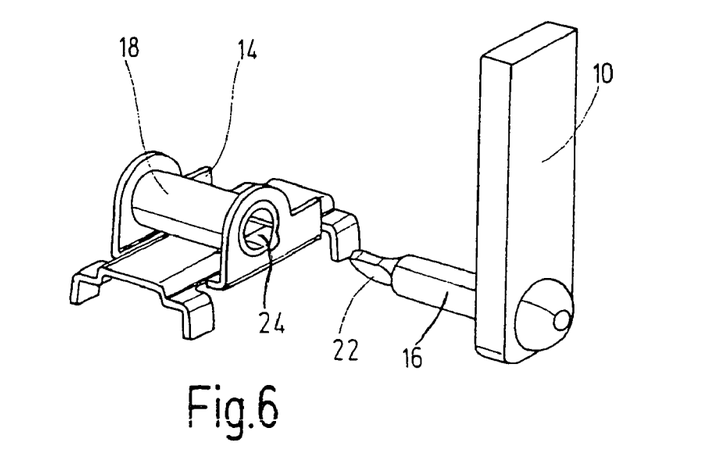
Figure 7:
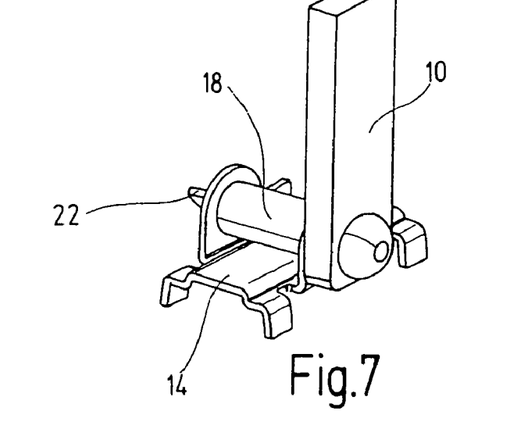
Figure 8:
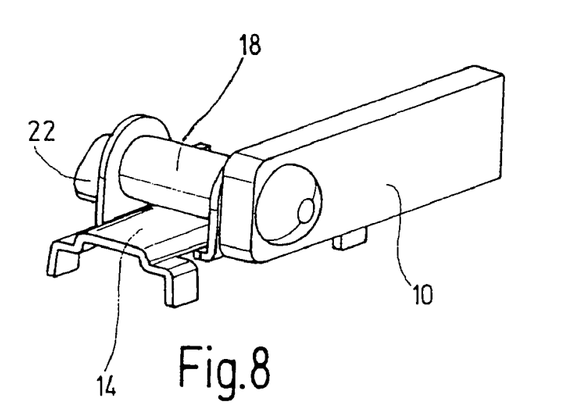
Figure 9:
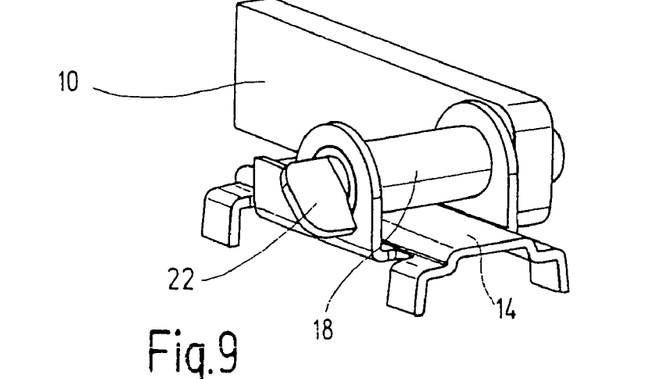

FIGS. 4 through 9 illustrate a second variation of a connecting arrangement in accordance with the invention. The coupling element 14 that is firmly attached to the wiper blade features in turn a bushing 18 for inserting a plug-in axis 16 fastened to the wiper arm 10. The bushing 18 has a longitudinal groove 24 parallel to its longitudinal axis in its cylindrical inner surface area (see FIG. 4), and this groove corresponds to a bow 22 on the end of the plug-in axis 16 (see FIG. 5). The bow 22 projects at one point beyond the outer circumference of the plug-in axis 16 so that the plug-in axis 16 can be inserted into the bushing 18 only in a specific angular position. This position is illustrated in FIGS. 6 and 7. In the depictions in FIGS. 8 and 9, the wiper blade or the coupling element 14 that is connected to it is brought into the operating position so that the bow 22 no longer aligns with the longitudinal groove 24 and the plug-in axis 16 cannot be pulled out the bushing 18. The wiper blade 12 is thereby swivelably locked with the wiper arm 10.

Figures 10, 11, 12:
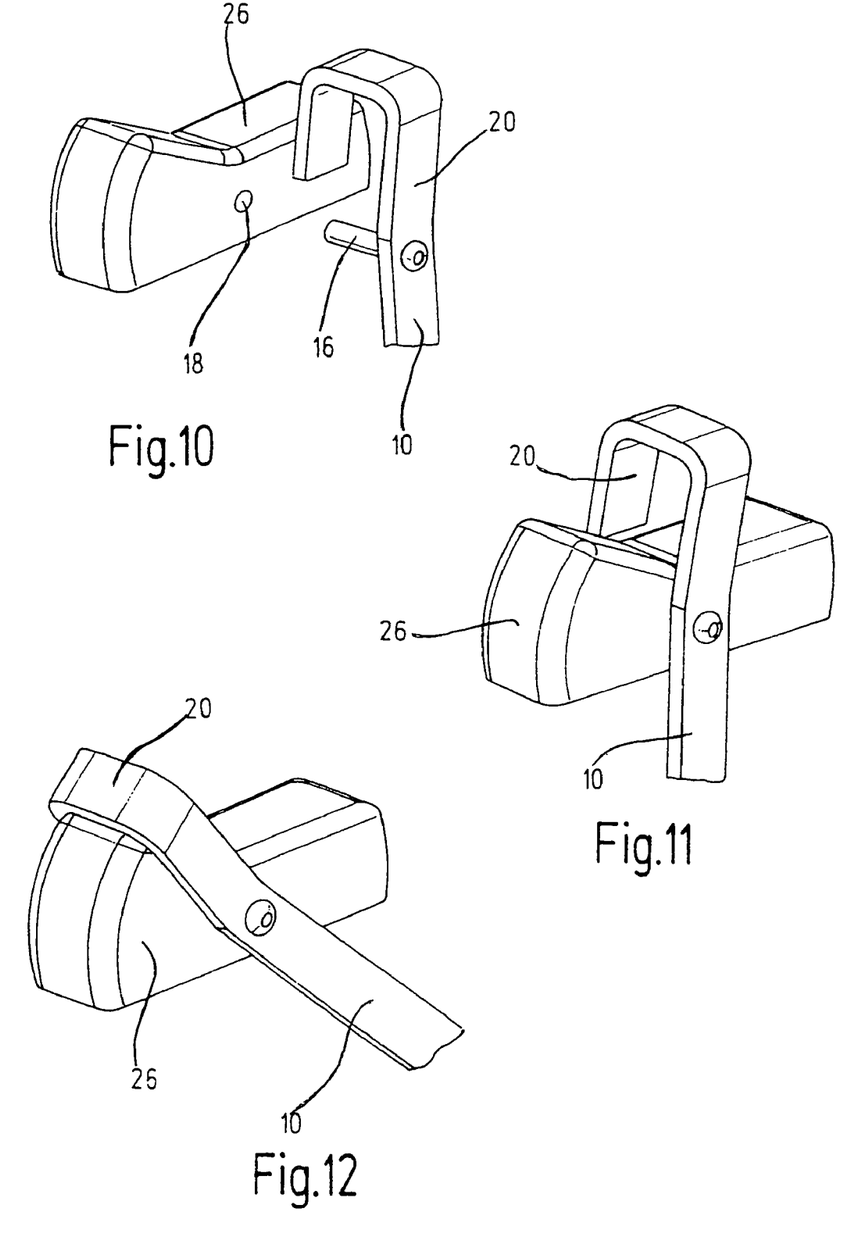
FIGS. 10 through 13 Schematic perspective representations of a third variation of the connecting arrangement in accordance with the invention.
Figure 13:
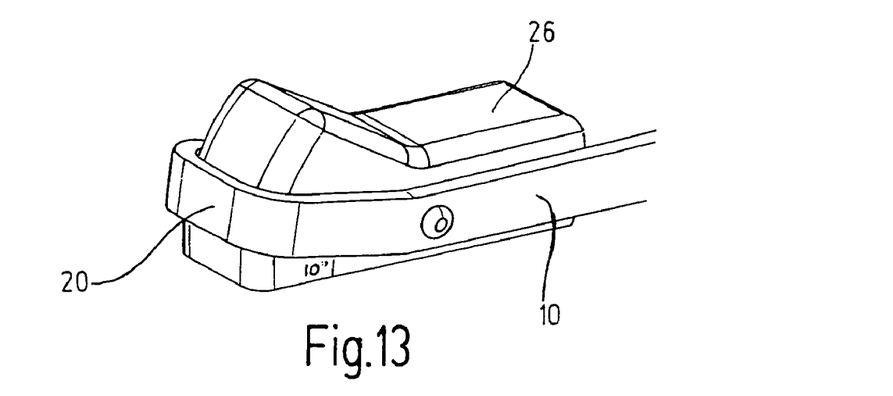

FIGS. 10 through 13 illustrate a third variation of a connecting arrangement in accordance with the invention, in which the wiper arm 10 itself is embodied on its end as a U-shaped catch hook 20. This catch hook 20 can grip around a covering 26 of a coupling element attached to the wiper blade in such a way that the plug-in axis 16 can be inserted into the bushing 18 of the covering 26 only in a specific angular position (see FIGS. 10 and 11). If, however, the wiper blade is swiveled against the wiper arm 10 (see FIG. 12), the catch hook 20 blocks an axial movement of the plug-in axis 16 in the bushing 18. At the same time, the catch hook forms an angular limit stop for the wiper blade in the vicinity of the operating position (see FIG. 13). The end of the catch hook 20 is at least so far from the plug-in axis 16 that it can be inserted into the bushing 18 in a specific angular position (FIGS. 10 and 11). The leg of the catch hook 20 has at least a width that makes gripping around the covering 26 and swiveling with a slight play possible. The covering 26 is preferably formed in such a way that the catch hook 20 is blocked in the vicinity of the operating position by a front side of the covering 26, as depicted in FIG. 13.

Figure 14:
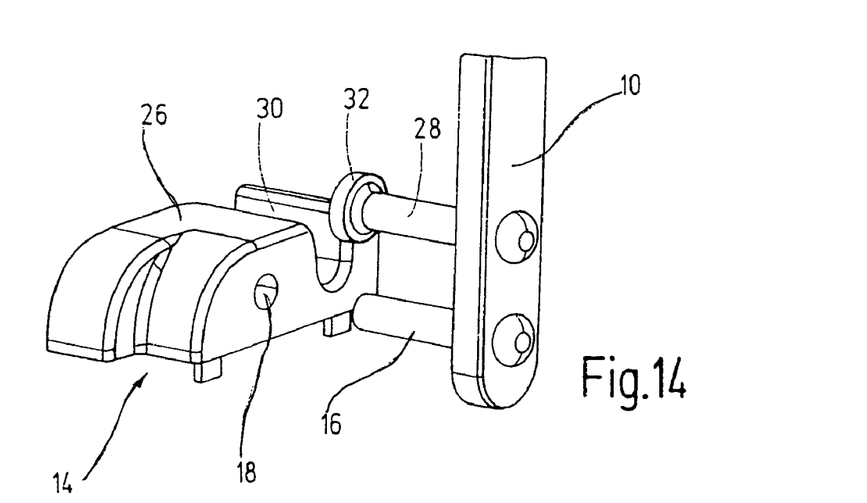
FIGS. 14 through 17 Schematic perspective representations of a fourth variation of the connecting arrangement in accordance with the invention.
Figure 15:
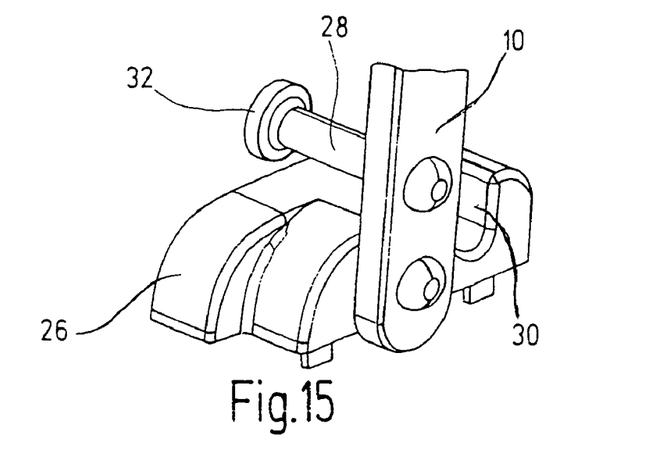
Figure 16:
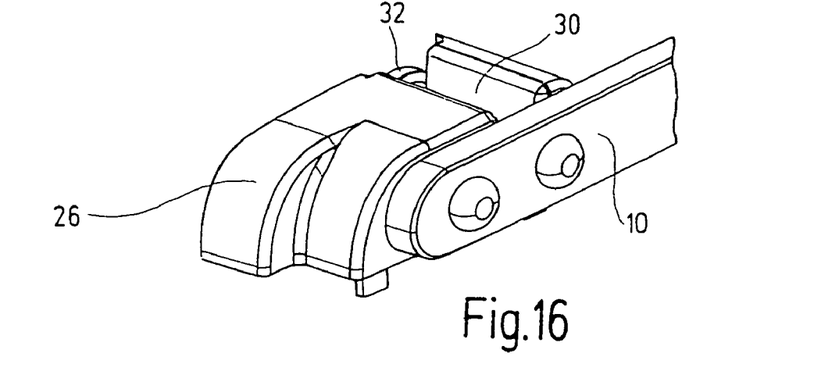
Figure 17:
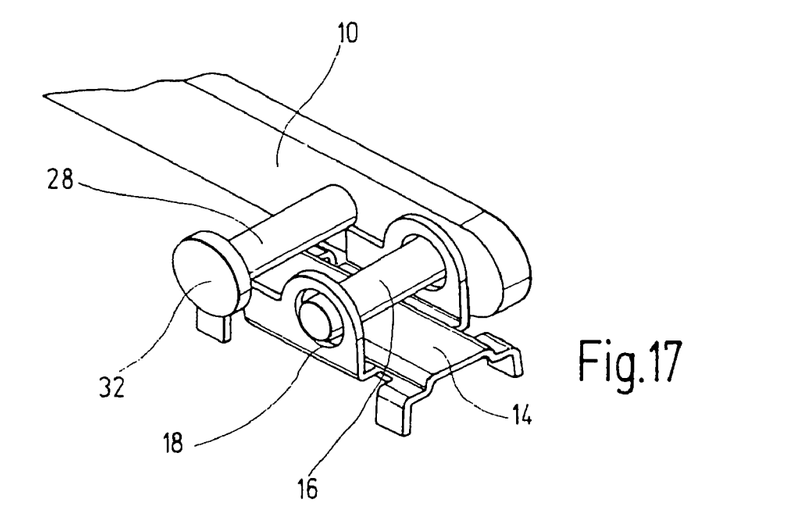

FIGS. 14 through 17 also show a fourth variation of a connecting arrangement in accordance with the invention, in which a locking pin 28 is arranged on the wiper arm 10 near and parallel to the plug-in axis 16, and the locking pin can engage in a trough-shaped receptacle 30 in the covering 26 of the coupling element 14 as soon as the wiper blade is put into the operating position (see FIGS. 16 and 17). FIGS. 14 and 15 illustrate the assembly position of the wiper blade, in which the locking pin 28 is above the covering 26 and is not engaged in the receptacle 30. In order to prevent an axial movement of the plug-in axis 16 in the bushing 18 in the operating position, the locking pin 28 features a heel 32 on its free end, whose outside diameter is greater than the opening of the receptacle 30. As a result, the wiper arm 10 is swivelably locked with the wiper blade 12 in the operating position (see FIG. 16). FIG. 17 shows the connecting arrangement in the operating position, whereby in this case the covering 26 is pulled off of the coupling element 14. The coupling element 14 features a contour with two parallel brackets stretching upward in which the bushing 18 is embodied as openings that are each aligned with one another. The receptacle 30 on the other hand is determined by the shaping of the covering 26.

Figure 18:
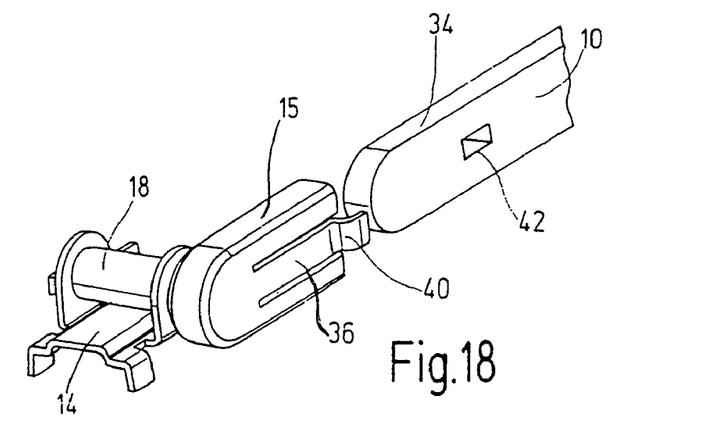
FIGS. 18 through 21 Schematic perspective representations of a fifth variation of the connecting arrangement in accordance with the invention.
Figure 19:
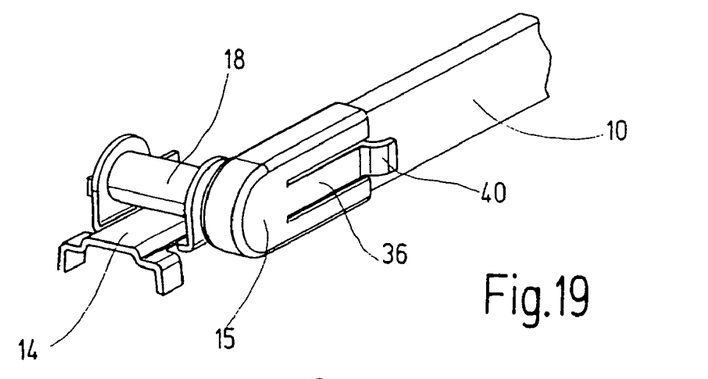
Figure 20:
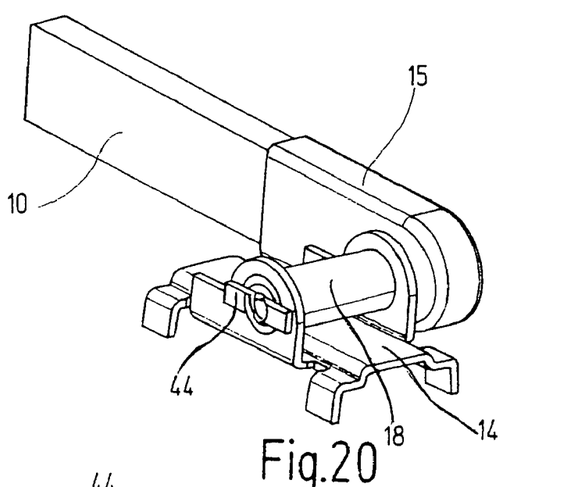

Finally, FIGS. 18 through 21 show a fifth embodiment of a connecting arrangement in accordance with the invention, in which the wiper arm 10 only has one free end with a recess 42 via which a second coupling element 15 can be slid, on which the coupling element 14 that is connected to the wiper blade is pivoted (see FIGS. 18 and 19). The plug-in axis 16 that is locked swivelably in the bushing 18 by means of folded-over locking brackets 44 (see FIG. 20) is firmly attached in this manner to the second coupling element 15. This second coupling element features a spring clip 36, which has a locking tooth 38 on its inner side pointing to the wiper arm 10 (see FIG. 21), which in the position that is slid on the wiper arm 10 engages in the recess 42 (see FIG. 18) and provides a detachable locking of the second coupling element 15 with the wiper arm 10.

Figure 21:
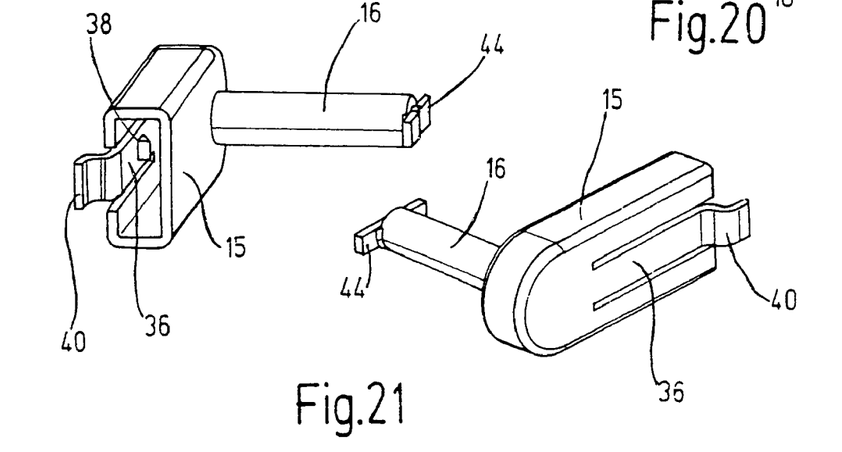

An unlocking handle 40 is arranged on the free end of the spring clip 36, and this unlocking handle makes it possible to manually unlock the locking tooth 38 and therefore pull the second coupling element 15 off of the free end 34 of the wiper arm 10.

The five variations of the connecting element depicted all make a connection of a wiper blade to a wiper arm of a motor vehicle possible that is very simple to handle and only has a few components. Because of the very few components that are embodied in a very simple manner, the connecting arrangements can be manufactured cost-effectively and are also suitable for retrofitting existing wiper arms.

The invention claimed is:

1. An apparatus for the detachable connection of a wiper blade (12) on a swivelable wiper arm (10) of a wiper for windows of motor vehicles, the apparatus comprising a bushing (18) one of connectable to the wiper blade and arranged on the wiper blade for accommodating a plug-in axis (16) of the wiper arm to define a pivot axis of the wiper arm and the wiper blade, and the apparatus comprising a device to lock the plug-in axis in the bushing at least in an operating position of the wiper blade, in which the directions of the longitudinal extension of the wiper blade and the wiper arm are aligned approximately parallel to one another, wherein the plug-in axis (16) extends transverse to the longitudinal extension of the wiper arm, wherein the device for locking includes a catch hook (20) arranged on the wiper blade (12), which in the operating position partially grips around the wiper arm (10) near the plug-in axis (16) and forms an angular limit stop for the wiper blade (12), the catch hook (20) being longitudinally spaced from the bushing on the wiper blade, the catch hook (20) having a first wall extending parallel to the pivot axis, the first wall being engageable with a portion of the wiper arm to provide the angular limit stop, the catch hook (20) having a second wall extending transverse to the pivot axis and to the first wall, wherein, in the operating position, the second wall is engageable with a portion of the wiper arm to limit axial movement of the wiper arm away from the wiper blade, the catch hook (20) having a third wall extending transverse to the pivot axis and to the first wall, the second wall and the third wall being on opposite ends of the first wall, wherein the wiper blade includes a connector (14), the connector (14) supporting the bushing (18) and the catch hook (20).

2. An apparatus according to claim 1, wherein in the operating position of the wiper blade (12), the catch hook (20) blocks an axial movement of the plug-in axis (16) in the bushing (18) to a large extent.

3. An apparatus according to claim 2, wherein the plug-in axis (16) can only be displaced in the bushing (18) in the axial direction in a pre-defined angular range that differs from the operating position.

4. An apparatus according to claim 3, wherein the wiper blade (12) can be separated from the wiper arm (10) in an angular position outside the operating position.

5. An apparatus according to claim 2, wherein the wiper blade (12) can be separated from the wiper arm (10) in an angular position outside the operating position.

6. An apparatus according to claim 1, wherein the plug-in axis (16) can only be displaced in the bushing (18) in the axial direction in a pre-defined angular range that differs from the operating position.

7. An apparatus according to claim 6, wherein the wiper blade (12) can be separated from the wiper arm (10) in an angular position outside the operating position.

8. An apparatus according to claim 1, wherein the wiper blade (12) can be separated from the wiper arm (10) in an angular position outside the operating position.

9. An apparatus according to claim 1, wherein the wiper arm has a first face and an opposite second face, wherein the plug-in axis projects from the first face, and wherein, in the operating position, the second wall of the catch hook (20) is engageable with a portion of the second face of the wiper arm to limit axial movement of the wiper arm away from the wiper.

10. An apparatus according to claim 1, wherein the wiper arm has a side wall extending between the first face and the second face, and wherein the first wall of the catch hook (20) is engageable with a portion of the side wall of the wiper arm to provide the angular limit stop.

11. An apparatus according to claim 1, wherein the wiper arm has a first face, an opposite second face and a side wall extending between the first face and the second face, wherein the plug-in axis projects from the first face, and wherein the first wall of the catch hook (20) is engageable with a portion of the side wall of the wiper arm to provide the angular limit stop.

12. An apparatus for the detachable connection of a wiper blade (12) on a swivelable wiper arm (10) of a wiper for windows of motor vehicles, the apparatus comprising a bushing (18) one of connectable to the wiper blade and arranged on the wiper blade for accommodating a plug-in axis (16) of the wiper arm to define a pivot axis of the wiper arm and the wiper blade, and the apparatus comprising a device to lock the plug-in axis in the bushing at least in an operating position of the wiper blade, in which the directions of the longitudinal extension of the wiper blade and the wiper arm are aligned approximately parallel to one another, wherein the plug-in axis (16) extends transverse to the longitudinal extension of the wiper arm, wherein the device for locking includes a catch hook (20) arranged on the wiper blade (12), which in the operating position partially grips around the wiper arm (10) near the plug-in axis (16) and forms an angular limit stop for the wiper blade (12), the catch hook (20) being longitudinally spaced from the bushing on the wiper blade, the catch hook (20) having a U-shape including a base portion extending parallel to the pivot axis and providing the angular limit stop, the catch hook (20) having a leg extending transverse to the pivot axis and to the base, wherein, in the operating position, the leg is engageable with a portion of the wiper arm to limit axial movement of the wiper arm away from the wiper blade, wherein the wiper blade includes a connector (14), the connector (14) supporting the bushing (18) and the catch hook (20).

* * * * *